(12) United States Patent
Xu et al.

(10) Patent No.: US 11,092,875 B2
(45) Date of Patent: Aug. 17, 2021

(54) RECONFIGURABLE NONLINEAR FREQUENCY CONVERSION WAVEGUIDE CHIP BASED ON MACH-ZEHNDER INTERFEROMETER COUPLED MICRORING

(71) Applicant: National University of Defense Technology, Changsha (CN)

(72) Inventors: Ping Xu, Changsha (CN); Yingwen Liu, Changsha (CN); Chao Wu, Changsha (CN); Junjie Wu, Changsha (CN)

(73) Assignee: National university of defense technology, Changsha (CN)

( * ) Notice: Subject to any disclaimer, the term of this patent is extended or adjusted under 35 U.S.C. 154(b) by 0 days.

(21) Appl. No.: 16/900,924

(22) Filed: Jun. 14, 2020

(65) Prior Publication Data

US 2020/0401012 A1     Dec. 24, 2020

(30) Foreign Application Priority Data

Jun. 18, 2019 (CN) .......................... 201910524964.9

(51) Int. Cl.
*G02F 1/365* (2006.01)
*G02F 1/35* (2006.01)

(52) U.S. Cl.
CPC .............. *G02F 1/365* (2013.01); *G02F 1/353* (2013.01); *G02F 1/3517* (2013.01); *G02F 2203/50* (2013.01)

(58) Field of Classification Search
None
See application file for complete search history.

(56) References Cited

U.S. PATENT DOCUMENTS 9,151,592 B2 * 10/2015 Mizrahi ................... G02F 1/21
10,372,014 B1 * 8/2019 Vidrighin ............... G02F 1/365
(Continued)

OTHER PUBLICATIONS

Fan Wang et al., "Improved Mach-Zehnder interferometer with micro-ring-resonator-based two-beam interferometer," 2009 IEEE/LEOS Winter Topicals Meeting Series, 2009, pp. 96-97, doi: 10.1109/LEOSWT.2009.4771674. (Year: 2009).*

(Continued)

*Primary Examiner* — Rhonda S Peace
(74) *Attorney, Agent, or Firm* — Treasure IP Group, LLC

(57) ABSTRACT

Reconfigurable nonlinear frequency conversion waveguide chip based on Mach-Zehnder interferometer coupled microring, the method is based on the integration of waveguide components of phase-adjustable Mach-Zehnder interferometers (MZI) and micro-ring resonators. The chip is illustrated by FIG. 1. The MZI couples light and photons into and output of the micro-ring resonator and controls the micorings' quality factor thus optimize the nonlinear frequency conversion processes inside the ring by the phase-modulator inside the MZI. The micro-ring resonator enables the non-linear optical generation of new frequency light beams and quantum light sources based on the second-order or third-order nonlinear optical process. Other optical waveguide components in region I and III of FIG. 1 are linear optical circuits for power splitting of pump beams and post-process of generated light beams or photons.

10 Claims, 9 Drawing Sheets

(56) References Cited

U.S. PATENT DOCUMENTS

2015/0323819 A1* 11/2015 Hu .................. G02F 1/035
    385/3
2018/0335570 A1* 11/2018 Fanto .................. G02F 1/225
2020/0348579 A1* 11/2020 Heuck .................. G02F 3/00
2020/0401012 A1* 12/2020 Xu .................. G02F 1/353

OTHER PUBLICATIONS

M. J. Strain et al., "Silicon micro-ring resonators with tunable Q-factor for ultra-low power parametric signal generation," 2013 Conference on Lasers & Electro-Optics Europe & International Quantum Electronics Conference CLEO Europe/IQEC, 2013, pp. 1-1, doi: 10.1109/CLEOE-IQEC.2013.6801414. (Year: 2013).*

S. Tang, Y. Zhang, Z. Wu, L. Zhou, L. Liu, Y. Chen, and S. Yu, "Tunable microwave photonic filter based on silicon nitride MZI-assist micro-ring resonator," in Asia Communications and Photonics Conference (ACPC) 2019, OSA Technical Digest (Optical Society of America, 2019), paper M3E.4. (Year: 2019).*

W. Bogaerts, P. D. Heyn, T. V. Vaerenbergh, K. D. Vos, S. K. Selvaraja, T. Claes, P. Dumon, P. Bienstman, D. V. Thourhout, R. Baets, "Silicon microring resonators", Las. Photon. Rev. 6, 47-73 (2012).

H. Jin, F. M. Liu, P. Xu, J. L. Xia, M. L. Zhong, Y. Yuan, J.W. Zhou, Y. X. Gong, W. Wang, and S. N. Zhu, "On-Chip Generation and Manipulation of Entangled Photons Based on Reconfigurable Lithium-Niobate Waveguide Circuits", Phys. Rev. Lett. 113, 103601 (2014).

C. Wang, C. Langrock, A. Marandi, M. Jankowski, M. Zhang, B. Desiatov, M. M. Fejer, and M. Lončar, "Ultrahigh-efficiency wavelength conversion in nanophotonic periodically poled lithium niobate waveguides", Optica 5, 1438 (2018).

C. Wang, M. Zhang, X. Chen, M. Bertrand, A. Shams-Ansari, S. Chandrasekhar, P. Winzer, and M. Lončar, "Integrated Lithium Niobate Electro-Optic Modulators Operating at CMOS-Compatible Voltages", Nature 562, 101 (2018).

M. Zhang, B. Buscaino, C. Wang, A. S. Ansari, C. Reimer, R. Zhu, J. M. Kahn, M. Lončar, "Broadband electro-optic frequency comb generation in a lithium niobate microring resonator", Nature (2019), https://doi.org/10.1038/s41586-019-1008-7.

M. He M. Xu Y. Ren J. Jian Z. Ruan Y. Xu S. Gao S. Sun X. Wen L. Zhou L. Liu C. Guo H. Chen L. Liu S. Yu L. Liu X. Cai "High-Performance Hybrid Silicon and Lithium Niobate Mach-Zehnder Modulators for 100 Gbit/s and Beyond". Nature Photonics (2019), https://doi.org/10.1038/ s41566-019-0378-6.

M. Ferrera, D. Duchesne, L. Razzari, M. Peccianti, R. Morandotti, P. Cheben, S. Janz, D.-X. Xu, B. E. Little, S. Chu, D. J. Moss, "Low power four wave mixing in an integrated micro-ring resonator with Q=1.2 million", Opt. Express 17, 14098(2009).

K. Guo X. D. Shi, X. L. Wang, J. B. Yang, Y. H. Ding, H. Y. Ou, Y. J. Zhao, "Generation rate scaling: the quality factoroptimization of microring resonators for photon-pair sources", Photon. Res. 6, 587 (2018).

I. N. Chuprina, P. P. An, E. G. Zubkova, V. V. Kovalyuk, A. A. Kalachev, G. N. Gol'tsman, "Optimisation of spontaneous four-wave mixing in a ring microcavity", Quantum Electron. 47, 887(2017).

M. Zukowski, A. Zeilinger, and H. Weinfurter, Entangling Photons Radiated by Independent Pulsed Sources, Ann. N. Y. Acad. Sci. 755, 91 (1995).

A. W. Bruch, X. Liu, X. Guo, J. B. Surya, Z. Gong, L. Zhang, J. Wang, J. Yan, and H. X. Tang, 17 000%/W second-harmonic conversion efficiency in single-crystalline aluminum nitride microresonators Appl. Phys. Lett. 113, 131102 (2018).

* cited by examiner

Region I    Region II    Region III

RECONFIGURABLE NONLINEAR FREQUENCY CONVERSION WAVEGUIDE CHIP BASED ON MACH-ZEHNDER INTERFEROMETER COUPLED MICRORING

FIELD OF THE INVENTION

This application takes priority from a prior filed Chinese application CN 201910524964.9, entitled "Reconfigurable nonlinear frequency conversion waveguide chip based on Mach-Zehnder interferometer coupled micro-ring" on Jun. 18, 2020, which the Chinese application are hereby incorporated by reference in its entirety.

The present disclosure is generally directed at both integrated optics, nonlinear optics, quantum optics, nonlinear materials and optoelectronic technology. It uses integrated optics theory and technical approaches to realize a high-efficiency nonlinear frequency conversion device and a high-quality quantum light source device.

BACKGROUND OF THE INVENTION

Waveguide microring resonator is a kind of integrated optical device with wide range of applications and excellent quality, which is widely used in classical sensing, filtering, switching, delay, nonlinear frequency conversion and quantum light source generation in the quantum field [1]. The materials of the microring resonator include silicon, lithium niobate, silicon nitride, gallium arsenide, aluminum gallium arsenide and other materials, wherein, lithium niobate [2-6] and silicon [1] are the representative second-order and third-order nonlinear optical materials and have obvious advantages in the preparation and application of waveguide microring resonators [1,5]. Lithium niobate has high second-order non-linear coefficients, and can be periodically polarized to achieve phase matching, thus achieving high-efficiency nonlinear frequency conversion. Besides, it has efficient and fast electro-optic effect devices, which can achieve high-speed electro-optic modulation with low half-wave voltage [2,4]. Currently, the use of lithium niobate films has reduced the half-wave voltage to 2V [4], and the modulation speed has reached above 100 GHz [6]. The silicon waveguide microring resonator has become promising because of its CMOS-compatible process advantages, strong local mode effects, large third-order nonlinear coefficients, and thermo-optic modulating phase technology [1].

In general, the coupling in and out of the micro-ring resonator is achieved by a straight waveguide. Namely, the straight waveguide and the microring are designed to have a coupling region [see FIG. 2 of Reference 1]. Designing appropriate coupling gap and length let the coefficient reach a certain value, such as critical coupling, at which point, the external quality factor determined by the coupling coefficient equals the internal quality factor determined by the intrinsic loss of the microring (lager external quality factor is called under coupling, lager internal quality factor is called over coupling). Two straight waveguides are coupled with microrings to form a four-port structure, that is, In, Through, Add, and Drop ports [see FIG. 2 of Reference 1]. The two straight waveguides coupled with microrings each have a coupling coefficient, which enable design their respective coupling gap and length to design the coupling-in and coupling-out states of the microring, respectively. Nonlinear frequency conversion and entangled photon pairs generation is theoretically determined by the coupling condition of the microring [7-9]. Generally, different coupling coefficients need to be designed according to different application requirements. For example, the continuous pumped four-wave mixing process obtains the highest conversion efficiency when the four waves are in a critical coupling condition [7], while the spontaneous four-wave mixing process for a quantum light source has more different coupling requirements [8,9]: when the number of photons to be measured is the highest, the continuous pumped light needs to be at the critical coupling point, and the generated signal and idle photons must be in a specific over coupling condition, that is, the external quality factor is 0.5 [8, 9]; when the photon pairs generated in the micro-ring are highest, the idler and signal photons need to be in under coupling condition[8, 9]; When the photon purity is need to be high, the quality factor of the pump light should be much lower than the signal and idler photon quality factors [10].

The above are the results of theoretical research. It is very challenging to experimentally approximate the required coupling conditions. The general solution is to design the coupling coefficient namely the external quality of the microring and the straight waveguide to be a certain value based on the internal quality factor of the previous test, so as to control the microring to be at a certain coupling condition. However, this method of controlling the coupling coefficient by controlling the coupling gap and coupling length is difficult, because the processing technology has errors and fluctuations, and the samples processed by different micromachining centers are also very different. Thus, the microring's intrinsic and extrinsic quality factor will fluctuate and the specific coupling conditions cannot be accurately achieved. One method is to design many samples of straight waveguide microring coupling units with different coupling gaps on a single chip and select them through testing [8]. Another serial approach is to design multiple microrings with different coupling coefficients for series connection [11] and select microrings close to the target coupling state for use. However, these designs have obvious shortcomings. One is that the design has more microrings and takes up a larger area. The other is that the coupling parameters cannot be adjusted continuously. The optimized parameters of the design can be selected among multiple microrings but the coupling coefficient cannot be optimized continuously, that is the target coupling condition cannot be accurately obtained.

Therefore, if there is a technical solution that can dynamically adjust the coupling coefficient of the microring at a wide range of continuous and accurate tunability among under coupling, critical coupling, and over coupling, then it can dynamically optimize to different coupling conditions, adapt the requirements of different physical processes, will become key devices for improving nonlinear frequency conversion efficiency, quantum light source brightness, purity, identity, and heralding efficiency and will be widely used in optical communication, nonlinear optics, quantum communication, and quantum computing.

SUMMARY OF THE INVENTION

The disclosure is directed at a method and apparatus for the reconfigurable nonlinear frequency conversion waveguide chip, solving the problems mentioned above. The Mach-Zehnder Interferometer (MZI) is used as the microring resonator's coupling waveguide to realize the dynamic control of the microring's quality factor, continuously and accurately approximate the coupling conditions required for various nonlinear processes, optimize the nonlinear processes in the ring including increasing the intensity of the converted light fields, as well as the quality such as brightness, the spectral purity, indistinguishability and heralding efficiency of quantum light sources.

The technical solution of the present invention is to design a chip device capable of dynamically optimizing the nonlinear optical frequency conversion efficiency and the quality of the quantum light source, namely an MZI-coupled microring waveguide chip. The waveguide optical circuits are fabricated on the second-order or third-order nonlinear optical materials and the waveguide MZI is designed as the coupling waveguide of the microring resonator. The above MZI-coupled microring chip device is mainly composed of phase-adjustable MZIs and microring resonators and also includes an expanded structure based on this, such as a cascaded-MZI coupled microring, multiple independent MZIs coupled microring, MZI-microring-straight structure, as shown in FIG. 1. The thermo-optic, electro-optic, and optical-Kerr effect are used to control the phase difference between two arms of the MZI interferometer to achieve the adjustment of the microring's factor, so as to optimize the nonlinear frequency conversion process in the microring, including nonlinear parametric processes and spontaneous parametric processes that generate quantum light sources.

As shown in FIG. 1, light is incident from the MZI's straight waveguide and is coupled and split through the microring's first coupling region. After the beam splitting, one light field is coupled to the microring and the other light field is freely transmitted through the other arm of the interferometer. Then the two parts of the light field are coupled again to interfere with each other with a part of the light field being transmission output and the other part of the light field staying in the ring and finally stabilizing into the microring's resonance mode. Compared with the incident waveguide, the resonance mode has an enhanced effect, which increases the energy density of the light field inside the cavity, thereby improving the nonlinear frequency conversion efficiency in the microring. The resonance-enhanced nonlinear frequency conversion process of the present invention is controlled by the phase difference between the MZI's two arms and the invention is a device that can dynamically optimize the nonlinear conversion process.

The area of the MZI-microring coupling chip is about several tens to several hundreds of microns square. The chip material includes all second- and third-order nonlinear optical materials that can be made into a waveguide, including lithium niobate, silicon, silicon nitride, gallium arsenide, aluminum gallium arsenide and aluminum nitride etc. The optimized nonlinear process in the MZI-coupled microring chip includes all second- and third-order nonlinear optical processes, including second harmonic generation, difference frequency generation, sum frequency generation, parametric optical amplification, parametric optical oscillation, spontaneous parametric down conversion, third harmonic frequency generation, four-wave mixing, and spontaneous four-wave mixing processes.

The phases in the MZI-coupled microring chip are controlled by thermo-optic, electro-optic and optical-Kerr effect. The resonance wavelength of the microring is controlled by thermo-optic, electro-optic, and optical-Kerr effect on the microring. The MZI-coupled microring chip further includes waveguide integrated circuits before and after the MZI-coupled microring structure, which is used to process and control the pump laser incident into the MZI-coupled microring and the parametric fields and quantum light sources output from the MZI-coupled microring. Both parts of the waveguide integrated optical circuits are equipped with electro-optic, thermo-optic and optical-Kerr modulators. The MZI-microring coupling chip enables the generation of high-efficiency, high-quality classical parametric light fields and quantum light sources through phase modulation inside the interferometer. The devices include high-efficiency frequency conversion devices and quantum light source generating devices such as high-brightness single-photon, two-photon and multi-photon light sources, as well as high heralding efficiency single-photon source, high-spectral-purity single-photon source, high-indistinguishability multi-photon sources.

Our invention device based on the MZI-microring coupling realizes a classical parametric process with high nonlinear conversion efficiency and a high-quality quantum light source.

After the light enters the straight waveguide through end coupling or vertical coupling, it is coupled and split through the first coupling region with the microring. After beam splitting, one beam is coupled to the microring, and the other part of the light field (the second path) transmits freely via the other arm of the interferometer. The two parts of the light field are coupled at the second coupling region between the microring and the waveguide and interference with each other. Then part of the light field is output and the other part of the light field stays in the microring and eventually stabilizes as the microring's resonant mode. Electro-optic, thermo-optic, and optical-Kerr modulators are set on the two arms of the interferometer (one of the arms is a part of the microring between the coupling and coupling out) to modulate the two optical path differences to change the interferometer output distribution, which is equivalent to dynamically controlling the microring's coupling coefficient, extrinsic quality factor and total quality factor, thereby optimizing the efficiency of the nonlinear process in the microring and the quality of the quantum light source.

The optical path difference between the two arms of the MZI is designed to different values as required. If the arm difference of the MZI is set to be an integer multiple of the microring's perimeter, adjusting the phase difference between the two arms of the MZI can simultaneously adjust the quality factors of all resonance modes, so that several wavelengths in the nonlinear process can be controlled at critical coupling or other specific coupling condition. If the arm difference of the MZI is set to an odd multiple of the microring's half-perimeter, the quality factor of the neighboring resonant modes in the microring are changed in the opposite direction. The quality factor of one resonant mode is increased while the other is decreased. Finally, the two wavelength quality factors are tuned to a certain ratio, thereby optimizing the rate and spectral purity of the quantum light source. If the arm difference of the MZI-microring coupling waveguide chip is set to other values, the change trend of each resonant mode is different, and it is designed as required.

Mainly based on Mach-Zehnder interferometer and microring resonator other similar extended structures are included, such as cascaded-MZI coupled microring, multiple independent MZIs coupled microring, MZI-microring-straight structure. The cascaded MZI indicates three or more regions coupled with the microring thus achieving more degrees of freedom through multiple phase modulation. The extended structures also include the coupling of two or more independent Mach-Zehnder interferometers to be coupled with microrings. Each interferometer controls the quality factor of different resonant wavelengths separately. The MZI-microring-straight structure includes the introduction of additional coupling straight waveguides to form a four-port microring structure in addition to the MZI coupler. The MZI-coupled microring includes MZI-microring coupled structure and various combinations of its extended structure, providing array-type nonlinear frequency conversion and quantum light source devices. The MZI-coupled microring chip also includes integrated waveguide optical circuits that performs linear optical processing on the incident light fields and the outgoing light fields.

The design of our invention has two technical points. First, the phase modulator is provided in the MZI to modulate the condition of the interferometer, which is equivalent to dynamically controlling the coupling coefficient of the microring, namely the extrinsic quality factor and the total quality factor. The second is requiring optical path difference between the two arms of the MZI which can be designed as required. For example, when it is designed to be an integer multiple or a fraction of an integer of the microring's perimeter, or it is designed to be an odd multiple and a fraction of an odd of half the microring perimeter, there is a certain relationship between the interference period of the MZI and the microring's free spectral range, which makes MZI play a role in modulating the quality factors of each resonant mode participating in the nonlinear process. Based on the above two points, the phase modulator in MZI can modulate the quality factors of several wavelengths involved in the nonlinear process in the microring, and adjust it as needed to optimize the efficiency of the nonlinear generation process and the quality of the quantum light source.

The key points of the present invention are as follows:
(1) The MZI replaces the traditional straight waveguide to realize the coupling and decoupling of the microring
(2) A phase modulator is installed on the MZI, which adjusts the phase to change the interference result, realizing dynamic adjustment of the coupling coefficient
(3) MZI's arm length difference is designed as required. It is designed according to the needs of the nonlinear processes making coupling coefficients for different resonance peaks have specific values.

Advantages are the following.

The invention is mainly based on dynamic modulation of the microring's coupling coefficient by MZI and the wavelength dependence of such dynamic modulation, which has a decisive influence on the nonlinear optical process.

(1) With the advancement of micro-nano processing technology, the characteristic size of waveguides is getting smaller and smaller, such as silicon waveguides and lithium niobate thin film waveguides. The single-mode size of a waveguide at 1550 nm is about several hundred nanometers. So, the size of both the microring and MZI can be smaller and smaller and be controlled in a size of several hundred micrometers square, making the microring device has a good degree of integration and scalability.

(2) The invention uses the electro-optic, thermo-optical, and optical-Kerr effects on the waveguide chip, realizing the dynamic modulation of the coupling between the MZI and the microring. Besides, the coupling coefficient can be adjusted accurately within a wide range. It is a controllable, configurable, highly integrated, and versatile design.

(3) The effect of field enhancement and the increasement of nonlinear effect devices are obvious and the nonlinear process is determined solely by the quality factor. So adjusting the coupling coefficient is controlling the nonlinear optical process. Thus, the nonlinear process in the microring is designed as required.

(4) The design is universal, not only applicable to all second-order non-linear processes, but also all third-order non-linear processes, not only suitable for classical nonlinear frequencies, but also suitable for on-demand design of quantum light sources, that is the brightness, purity, and identity of quantum light sources can be optimized separately and collaboratively.

Based on the above characteristics, a chip device with a Mach-Zehnder interferometer coupled microring resonator that can dynamically optimize the nonlinear optical frequency conversion efficiency and the quality of the quantum light source is designed. It provides an efficient variable-frequency chip device and a waveguide chip for quantum light source with high brightness, high purity, high identity and high heralding efficiency.

The thermo-optic, electro-optic and optical-Kerr effect devices are used to control the phase difference between the two arms in the interferometer to achieve the adjustment of the microring's quality factor, so as to control and optimize both the efficiency of the classical nonlinear parameter process in the microring and the quality of the quantum light source. The chip is a kind of nonlinear frequency conversion device with high tolerance of process error, dynamic controllability and multi-purpose and can be used as bright single-photon source and multi-photon source devices, high heralding efficiency single-photon source device, high spectral purity single-photon source and high-indistinguishability multi-photon source devices and so on.

DETAILED DESCRIPTION OF THE EMBODIMENTS OF THE INVENTION

Figure 1:
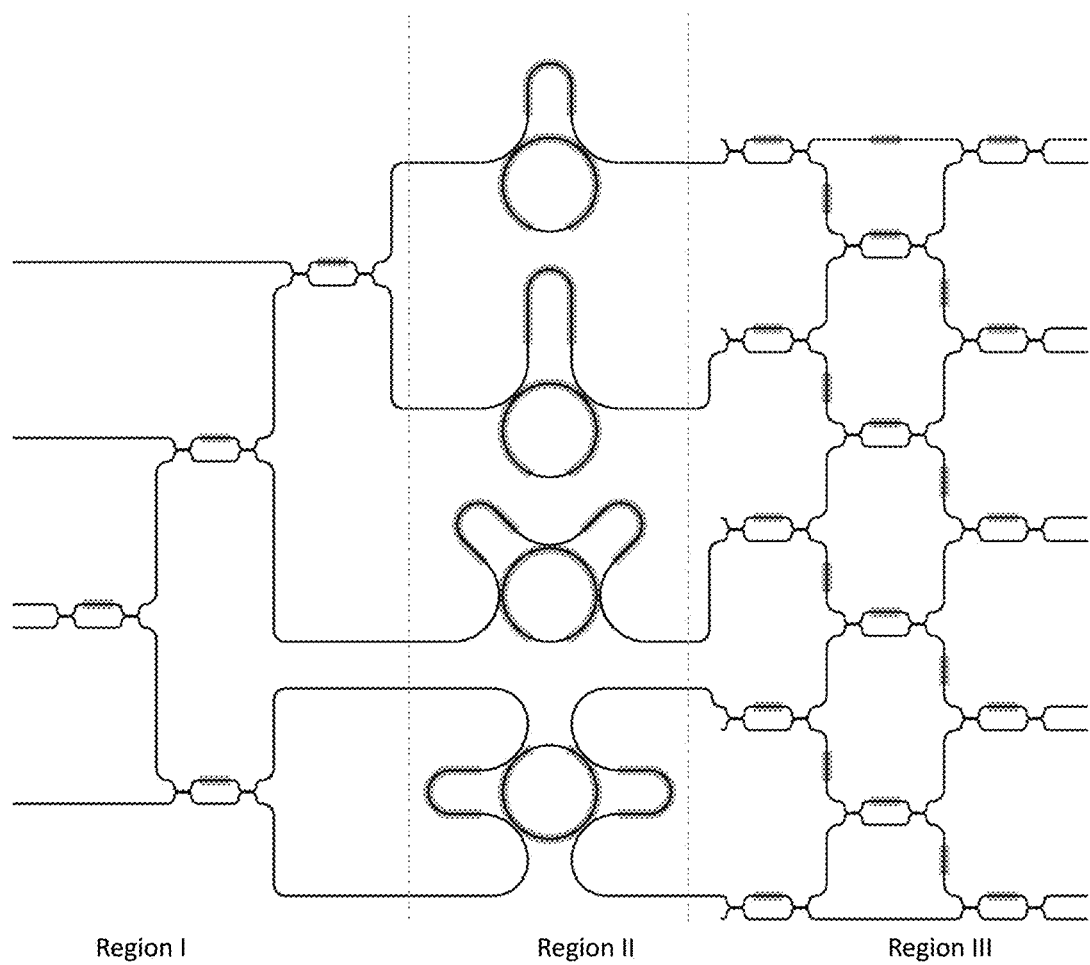
FIG. 1 is a schematic diagram of waveguide chip based on MZI-coupled microrings to achieve nonlinear frequency conversion (where functional units in each region are only briefly illustrated)

Mach-Zehnder interferometer (MZI) coupled microring resonator chip is mainly composed of a phase-tunable MZI-microring coupling device and includes a similar extended structure, such as a cascaded-MZI coupled microring, multiple independent MZIs coupled microring, MZI-microring-straight structure. These devices constitute the core region of the chip, which is region II in FIG. 1. There are four typical structures in Region II. From top to bottom, the first and second structures are single MZI-coupled microring with different arm lengths, the third is a cascaded-MZI coupled microring and the fourth is multiple independent MZIs coupled microring. The chip also includes integrated waveguide optical circuits before and after this core region II, which are used to process and control the pump laser incident on the MZI-coupled microring and the parametric light field and quantum light field emitted from the MZI-coupled microring. The two integrated optical circuits are equipped with electro-optic, thermo-optic, and optical-Kerr modulators. The integrated waveguide optical circuits before and after the region II are called region I and region III, respectively.

The material includes all second- and third-order nonlinear optical materials that can be made into a waveguide, including lithium niobate, lithium tantalate, KDP, KTP, silicon, silicon nitride, gallium arsenide, aluminum gallium arsenide, aluminum nitride, etc.

The optimized nonlinear process in the MZI-microring coupling chip includes all second- and third-order nonlinear processes, including second harmonic generation, difference frequency generation, sum frequency generation, parametric optical amplification, parametric optical oscillation, spontaneous parametric down conversion, third harmonic frequency generation, four-wave mixing, and spontaneous four-wave mixing processes.

The MZI-coupled microring chip obtains high-efficiency, high-quality classical parametric light fields and quantum light source generating devices through phase modulation in the interferometer, including high-efficiency frequency conversion devices, high-brightness single-photon two-photon and multi-photon light sources devices, high heralding efficiency single-photon source devices, high-purity single-photon two-photon and high-indistinguishability multi-photon source devices, etc.

The phase in the MZI-microring coupling chip is controlled by thermo-optic, electro-optic, and optical-Kerr effect devices.

The chip unit of the Mach-Zehnder interferometer (MZI) coupled microring in the region II is the key of the entire chip and is the innovation of the present invention.

Here is a detailed description of how it works. In general, the coupling in and out from microrings are coupled by a straight waveguide and a microring. The coupling region can be represented by a 2*2 matrix, namely $$\begin{bmatrix} t & i\kappa \\ i\kappa & t \end{bmatrix},$$

where t represents the ratio of the light field that is not coupled into the microring incident by the straight waveguide, $\kappa$ is the coupling coefficient between the microring and the straight waveguide. The light field incident from a straight waveguide has a $\kappa$ proportion that will couple into the microring, satisfying $|\kappa|^2+|t|^2=1$. $\kappa$ is a key parameter that determines the extrinsic quality factor of the microring, that is, whether it is critically coupled, over coupled, or under coupled.

Now that the present invention proposes using MZI as the microring's coupling waveguide, then the coupling of MZI and microring can be regarded as the multiplication of coupling, transmission, and coupling of three 2*2 matrices, and the final equivalent coupling matrix is $$e^{ikl_1} \begin{bmatrix} \cos\frac{\phi}{2} - 2\kappa^2\cos\frac{\phi}{2} + i\sin\frac{\phi}{2} & i2\kappa\sqrt{1-\kappa^2}\cos\frac{\phi}{2} \\ i2\kappa\sqrt{1-\kappa^2}\cos\frac{\phi}{2} & \cos\frac{\phi}{2} - 2\kappa^2\cos\frac{\phi}{2} - i\sin\frac{\phi}{2} \end{bmatrix},$$

where $l_1$ is the length of the microring in the two arms of MZI and $l_2$ is the length of the other arm in MZI. $\phi=\beta(l_2-l_1)+\theta$ is the relative phase difference between the two arms, which includes two part. One part is the relative phase difference determined by the arm length difference $\beta(l_2-l_1)$, where $\beta$ is propagation constant in waveguide, the other part $\theta$ is the phase difference induced by electro-optic, thermo-optic or optic-optic effect devices applied to the arm of MZI. According to this coupling matrix, it is found that the current equivalent coupling coefficient is $$\kappa' = i2\kappa\sqrt{1-\kappa^2}\cos\frac{\phi}{2}.$$

So different arm length differences and relative phase can effectively adjust the microring's coupling coefficient. For a certain microring's resonant mode, adjusting the phase difference between the two arms will adjust the coupling coefficient, namely the extrinsic quality factor, and select critical coupling, under coupling and over coupling condition. However the arm difference $\Delta l=l_2-l_1$ causes different phase difference for different wavelength, that is different resonant modes have different phase differences and their respective quality factor will vary differently. Therefore, the setting of the arm length difference can be used to set the change law of the quality factors of several frequencies participating in the nonlinear process to achieve the purpose of designing on demand. However, it should be noted that the actual equivalent coupling matrix also needs to consider the asymmetry of transmission loss in MZI. The equivalent coupling coefficient, intrinsic and extrinsic quality factors need to be slightly modified, but its working principle is unchanged.

Mach-Zehnder interferometer coupled microring chip device based on silicon waveguide can dynamically optimize the nonlinear optical frequency conversion efficiency and the quality of quantum light source. The following specific examples 1 to 5 are classic four-wave mixing and quantum light source generating devices based on the core device of MZI-microring coupling. The material of all chip devices in the examples of the present invention is silicon, but it is not limited to silicon material. The cross-sectional dimension of the silicon waveguide is 500 nm×220 nm, and the buffer layer is silicon dioxide, which is for a single-mode waveguide at 1550 nm. The radius of the microring is 28 μm, and the interval between the microring resonant peaks namely the free spectral range around 1550 nm is 3.2 nm (400 GHz). The short arm length of the MZI is $l_1$, the long arm length is $l_2$, and the optical path difference between the two arms is set to Δl. A thermo-optic modulator ($l_3 < l_2$) with a length of $l_3$ is set on the long arm. The two coupling regions between the MZI and microring are close to each other with the same radius of curvature as the microring.

Figure 2:
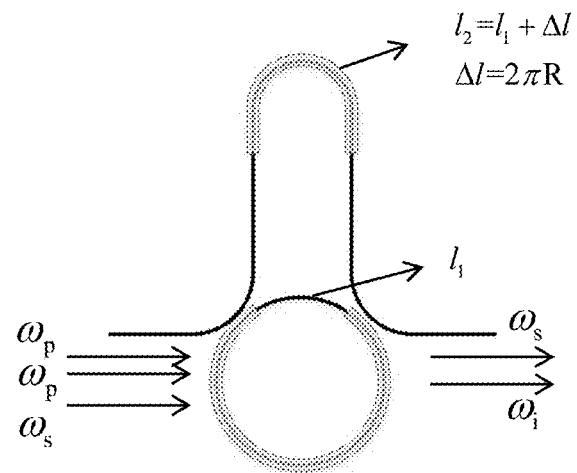
FIG. 2 is a silicon MZI-coupled microring device for high-efficiency four-wave mixing.
Figure 3:
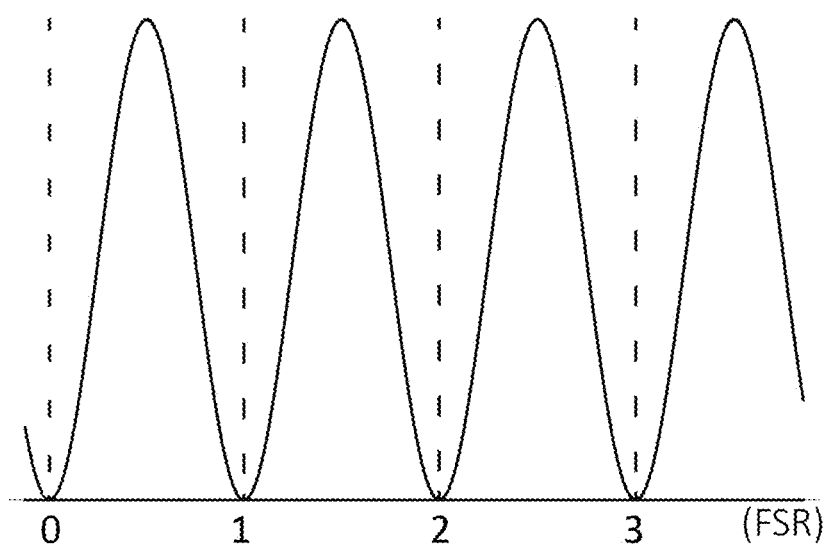
FIG. 3 is a microring's resonant mode and MZI's interference period (the two free spectral ranges are equal)

Example 1: Silicon MZI-Coupled Microring for High-Efficiency Four-Wave Mixing Chip Device Example 1 is a silicon MZI-coupled microring for high-efficiency four-wave mixing chip device, as shown in FIG. 2. The four-wave mixing process refers to frequency difference between two pumping fields and one signal field to obtain another idler field. The signal, idler and two pump fields must meet energy and momentum conservation. For the microring structure, the four interacting fields should be at the microring's resonant modes. The MZI two arms' optical path difference is set as Δl=2πR=175.929 μm. Then, the free spectral range (FSR) of the MZI is the same as that of the microring and both FSRs are 3.2 nm (400 GHz). When the MZI phase is adjusted, all resonant peaks undergo the same change, that is, the quality factors increase or decrease at the same time, as shown in FIG. 3. The coupling gaps of the two coupling regions between the MZI and the microring are both 180 nm and the coupling coefficient of each coupling region is 0.1443 (the wavelength is 1550 NM, which ensures that the maximum equivalent coupling coefficient of the MZI reaches the over coupling condition). Adjusting the phase difference between the two arms can make the equivalent coupling coefficient run from near zero to a large value and then return to zero. Therefore, the microring is continuously adjusted from the under coupling condition to the over coupling condition and then to the under-coupling, which means that the critical coupling point will be obtained twice within a phase adjustment period. According to theoretical calculations, the maximum conversion efficiency of continuous pumped four-wave mixing process is obtained, namely the maximum idler output (signal amplification effect), when the four interacting beams are at critical coupling condition [7]. By adjusting the phase of the MZI, the microring can be optimized to the critical coupling state, and the critical coupling condition will appear twice in one cycle. Therefore, it is expected that the difference frequency optical conversion efficiency will get two maxima in one cycle when adjusting the phase difference.

Figure 4:
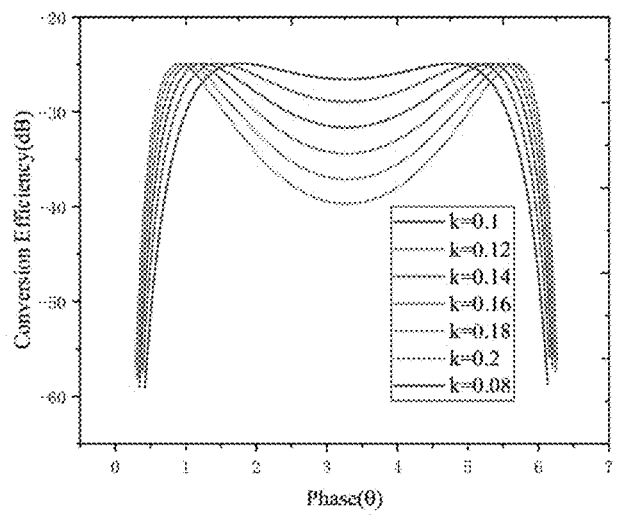
FIG. 4 shows the calculated idler conversion efficiency (divided by the incident signal light) from the four-wave mixing in the MZI-coupled microring under different MZI's phase, wherein the two highest conversion efficiency can be optimized under two MZI's phases (applied voltages)

FIG. 4 is a theoretical calculation of the idler conversion efficiency (ratio of the incident signal energy) from the four-wave mixing process in this chip with the MZI phase varying. There should be the highest conversion efficiency near the critical coupling. Under over coupling and under coupling conditions, the conversion efficiency is significantly reduced.

Figure 5:
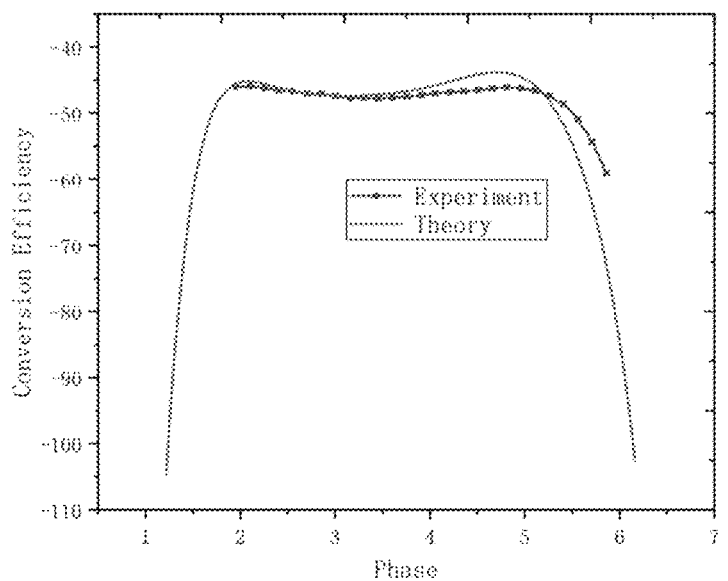
FIG. 5 shows experimental idler's conversion efficiency pumped by continuous light (red (light) line is theoretical value)

FIG. 5 shows the measured idler conversion efficiency pumped by continuous wave. The pump and signal wavelengths are at 1549.3 nm and 1546.1 nm, respectively and their powers (power in the straight waveguide before it is coupled to the microring) are 88 μw and 22 μw, respectively. It is found that there are indeed two maximum values when tuning the voltage of the MZI, namely the two phase difference and both of which are near the critical coupling condition. However, because the actual MZI-coupled microring chip needs to consider the different loss coefficients of the long and short arms, the actual measured values of the intrinsic and extrinsic quality factors are different from the ideal condition (the long and short arms' loss is the same). The position of the maximum value varies, but the trend is basically unchanged. The FIG. 5 shows the experimental idler conversion efficiency pumped by continuous wave (the red (light) line is the theoretical efficiency).

Figure 6:
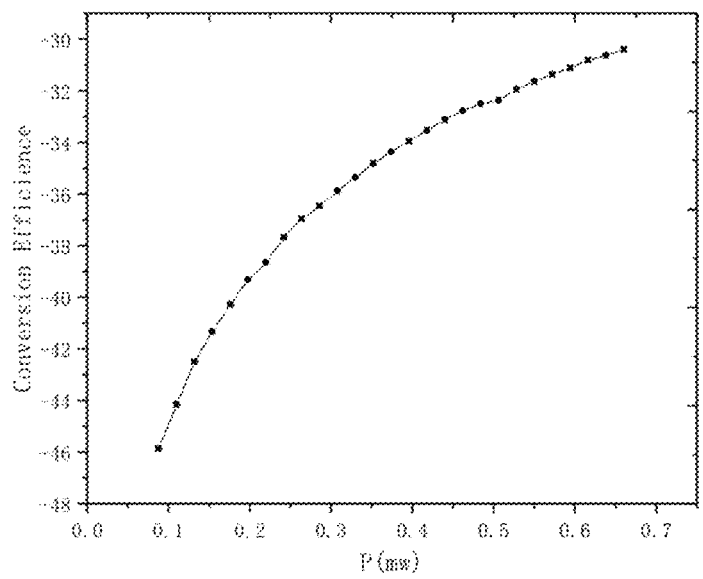
FIG. 6 shows the experimental test of idler conversion efficiency as a function of pump power.

FIG. 6 shows the idler conversion efficiency obtained by increasing the pump power with the signal optical power being unchanged and the MZI voltage being set at the highest conversion efficiency of idler, which is basically quadratic with the pump power. When the pump power is close to 0.7 mW, the conversion efficiency of 31 dB is obtained, which is much higher than that in other published articles and proves that the structure can indeed improve the conversion efficiency of the four-wave mixing process.

Figure 7:
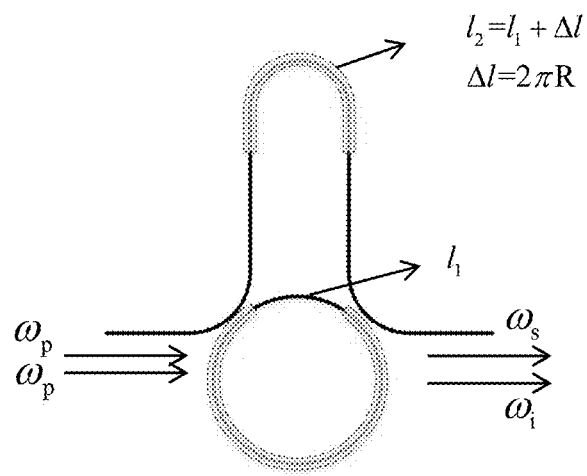
FIG. 7 shows a silicon MZI-coupled microring chip for high-brightness two-photon generation.

Example 2: The MZI-Coupled Microring Chip for High-Brightness Two-Photon Generation The structure of the second example is the same as that of the first example, as shown in FIG. 7. The two arms difference is also Δl=2πR=175.929 μm, but the difference is that this is a chip device used for high-brightness two-photon generation, and its input and output light have different configurations and properties. Only the pump light is put into the chip, and the spontaneous four-wave mixing process occurs in the microring. The two pump photons annihilate to generate a pair of signals and idler photon pairs, that is the process of generating entangled photon pairs. This process needs the pump, signal and idler to be at over coupling ($Q_{ext}$=0.75 $Q_{int}$), thus obtaining the highest coincidence rate.

Figure 8:
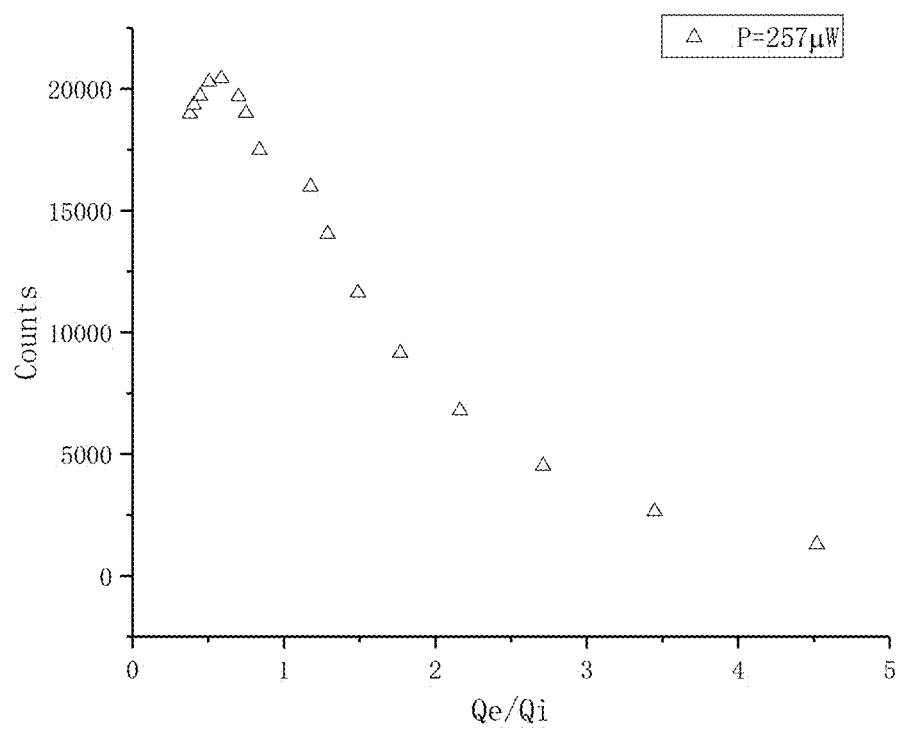
FIG. 8 shows the experimental two-photon coincidence rate obtained by adjusting the MZI voltage (equivalently changing the extrinsic and intrinsic quality factor ratio)

FIG. 8 is a two-photon coincidence rate obtained by experimentally adjusting the MZI voltage (ratio of extrinsic and intrinsic quality factor) when the structure is pumped with 1549.3 nm continuous pump light. There is indeed a maximum value when the ratio is close to 0.75, which indicates that the structure indeed plays a role in optimizing the photon generation rate. Similarly, the single-photon heralding efficiency, signal-to-noise ratio, and single-photon purity g (2) can be optimized. One such structure can meet the needs of multiple quantum light sources.

Example 3: The MZI-Coupled Microring Chip Device for High-Purity Two-Photon Generation The structures of example 3 are similar with the specific example 1 and example 2, but the MZI's two arms difference is Δl=πR=87.965 μm. The spectral purity control of two-photon pairs generated by spontaneous four-wave mixing is studied to obtain a photon source with pure state spectrum, which is of great significance for quantum interference and quantum computing. At this time, the MZI's FSR is twice of the microring's. Therefore, when the pump light is set at a certain resonant mode, the quality factors of the generated signal and idler photons at the neighboring resonant modes are different from the pump. With the voltage change of one arm in MZI, the signal and idler's quality factors are exactly the same, but they are completely opposite to the change law of the pumps. Therefore, the voltage can be adjusted to obtain some specific states, that is the pump's quality factor is smaller and far smaller than the signal and idler's, which is the necessary and sufficient condition for spectrum disassociation.

Figure 9:
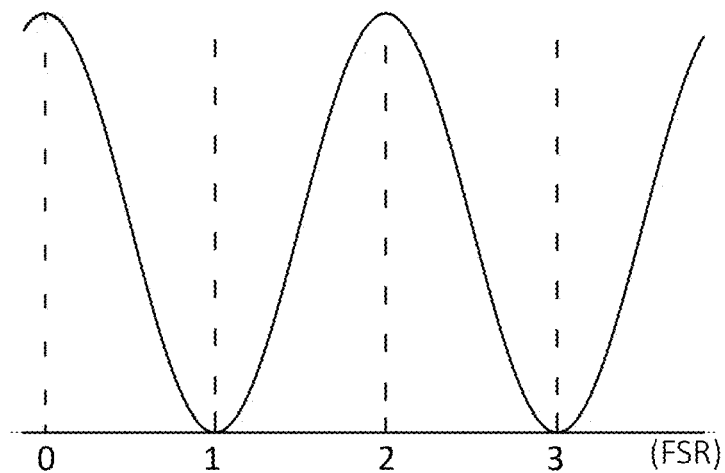
FIG. 9 shows microring's resonant modes and MZI's interference period (The microring's FSR is ½ of MZI's)

FIG. 9 is a schematic diagram of the microring resonant spectrum and the frequency spectrum of the MZI. The interference period of the MZI is twice of the microring's period (the microring's FSR is ½ of the MZI's). The MZI interference curve in the figure just makes the adjacent two microring's resonant wavelengths constructively and destructively in MZI interference. By adjusting the phase modulator on the microring, the microring resonant spectrum in the figure can be shifted left and right. Adjust the phase modulator of the MZI and the MZI interference curve in the figure also moves left and right.

Figure 10:
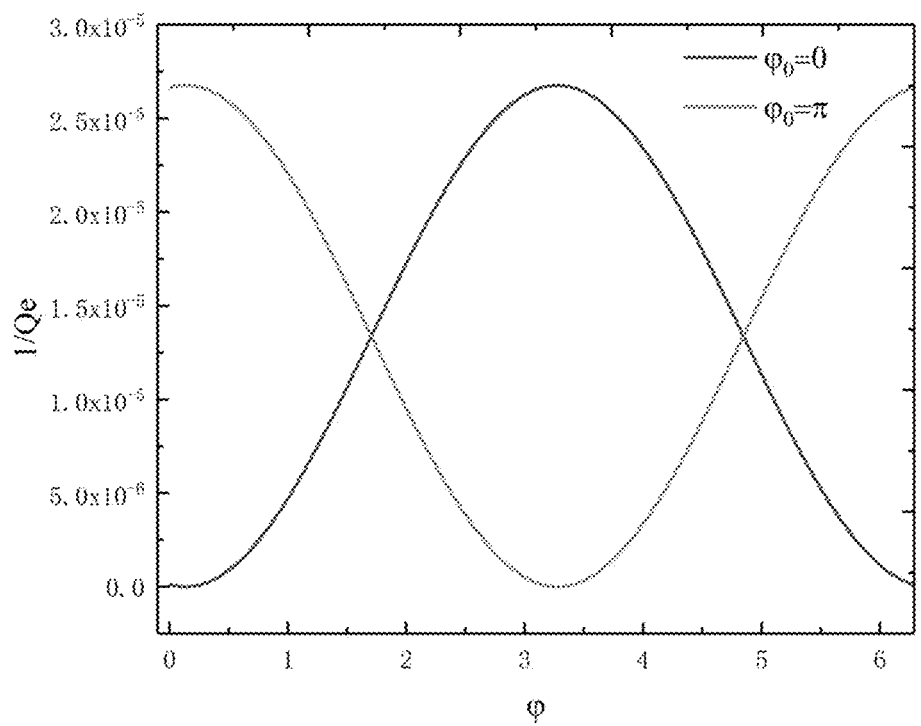
FIG. 10 shows the quality factors (Q-factor) of the pump and signal (idler) change theoretically when adjusting the voltage and the Q-factor ratio of pump to signal (idler) can be adjusted within a wide range.

FIG. 10 is the theoretical change trend of the pump and signal (idler) quality factors when adjusting the voltage. It can be seen that their ratio can be adjusted within a wide range.

Figure 11:
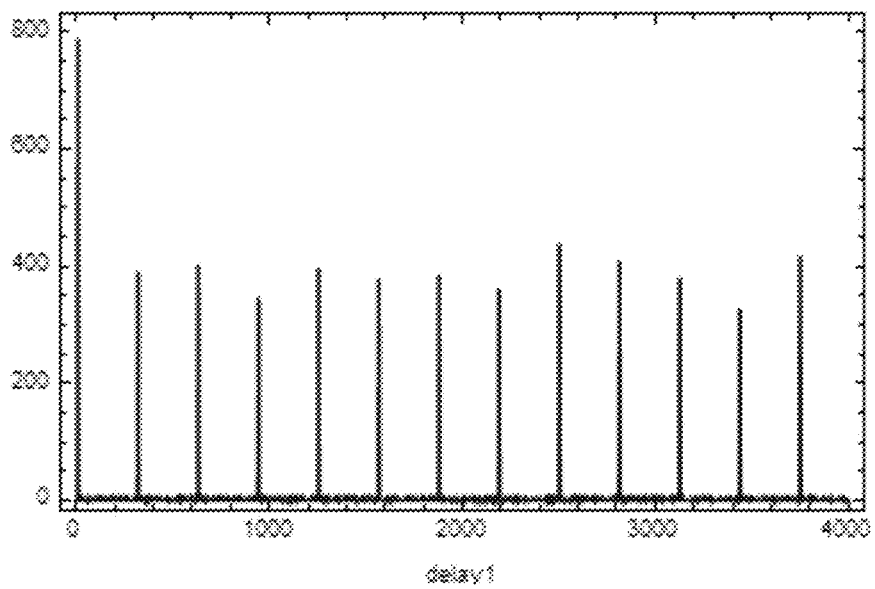
FIG. 11 shows the signal single photon's $g^{(2)}$ when the pump's quality factor is 3 times of the signal's (idler)

FIG. 11 shows the $g^{(2)}$ value of the signal single photon when the pump's quality factor is one third of the signal and idler's, which is close to 2. This is a test that reflects the spectral purity of a single photon. When the $g^{(2)}$ is 2, the spectral purity of the photon is 100%.

Example 4: Dual-MZI Coupled Microring Chip Device for High-Indistinguishability Four-Photon Generation Example 4 is a four-photon source chip based on silicon-based dual-MZI coupled microring with bidirectional operation. The two MZIs and the microring constitute a four-port system. The two MZIs adjust the pump photon and the generated signal and idler photons respectively. Both the two MZIs' arm difference are $\Delta l=\pi R=87.965$ μm. The radius of the microring is 28 μm, the same as the former structure. Therefore, the micoring's resonant mode can be suppressed periodically and the suppression period is twice the free spectral range of the microring. The process of spontaneous four-wave mixing to generate four photons is studied. Adjusting the phase of the two MZIs allows them to suppress different wavelengths, respectively and achieve the selection of the pump wavelength and the wavelength of the generated photons. For example, one MZI suppresses the pump light being coupled from the ring, and the other suppresses the signal and idler being coupled from the microring, so that their quality factors can be controlled separately. The coupling gaps of the two MZIs are designed with different values, and the coupling coefficient of the pump MZI is set to be larger, so that its extrinsic quality factor is much smaller than the signal and idler's extrinsic quality factor, then a spectral discorrelation photon pair can be obtained. At the same time, the structure adopts clockwise and counterclockwise bidirectional pumping. The pump light is coupled into the microring from one MZI, and the two ports of the other MZI get both clockwise and counterclockwise photon pairs, respectively, for a total of four photons. Because the clockwise and counterclockwise directions of the same microring are used, the spectra of the two photon pairs are the same. Therefore, the design of the dual-MZI bidirectional pumping enables the chip device to output identical four-photon pairs in the pure state.

The chip is divided into three regions, that is pump laser beam splitting region A, microring resonator region B, and on-chip filtering and interference region C respectively. The pump beam splitting region A is realized by the waveguide MZI structure, and the beam splitting ratio is controlled by the phase modulator of the MZI. After the pump beam splits, it enters region B and enters the MZI-coupled microring from clockwise and counterclockwise directions, respectively. Two entangled photon pairs are generated in both clockwise and counterclockwise directions, respectively and they are coupled out from the microring through the output side of the MZI at the two directions of the straight waveguide, which is the chip's core region. Then the photons enter the chip region C, that is the on-chip filtering interference region. The on-chip filter region is realized by an unequal arm MZI with arm difference being πR and the MZI's interference period is twice the microring's resonant period, which is used to separate the pump photon from the signal and idler photons. Then using the unequal arm MZI with the arm difference of πR/2 to separate the signal and idler photons. Finally, performing two-photon interference experiments on two idler photons or two signal photons under heralding conditions to perform a photon purity test, which is actually a four-photon coincidence experiment.

Figure 12:
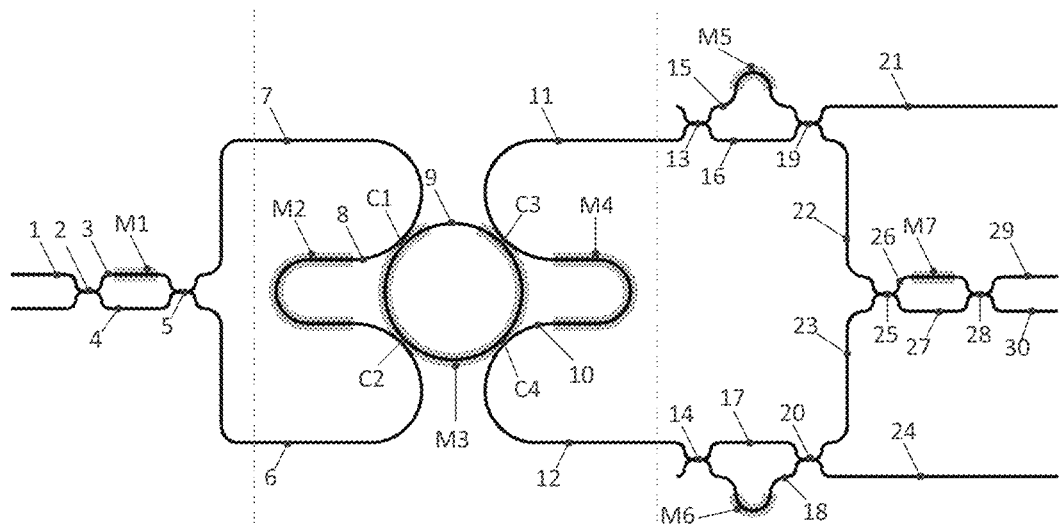
FIG. 12 shows dual-MZI coupled microring chip for high-indistinguishability four-photon generation.

We label each unit in the chip of FIG. 12. The pump laser is input from the waveguide 1 and split through the MZI. The beam splitter MZI includes 50:50 beam splitters 2, 5, waveguides 3, 4, and a phase modulator M1. By adjusting the phase value of the phase modulator M1, an adjustable beam splitting ratio can be achieved. The split laser enters the waveguides 6 and 7, namely, the micro-ring resonator region B. The main structure of the microring resonator region B includes a microring waveguide 9, a microring phase controller M3, an input terminal MZI (consists of a long-arm waveguide 8, a coupling region C1, a coupling region C2, and a phase controller M2) and an output terminal MZI (consists of a long-arm waveguide 10, a coupling region C3, a coupling region C4, and a phase controller M4). The pumped laser enters from the waveguides 6 and 7. By adjusting the phase controllers M2, M3, and M4, the pumped laser is coupled into and out of the microring through the input MZI, and it can resonate in the microring at both clockwise and counterclockwise directions. The generated photon pairs are coupled out from the output terminal MZI and enter the waveguides 11 and 12. The setting of the coupling strength of the coupling regions C1 and C2 and the coupling strength of the coupling regions C3 and C4 affect the pump photon's and the converted photons' quality factors, respectively. The coupling gap between the pump MZI and the microring is designed to be small to reduce its quality factor. The converted photon pairs in the waveguide 11 and waveguide 12 enter the on-chip filtering and interference region C. The on-chip filter region is composed of two unequal arm MZIs, and the interference period is four times the microring resonant period. The upper part MZI includes 50:50 beam splitters 13, 19, waveguides 15, 16, and a phase controller M5. The lower part MZI includes 50:50 beam splitters 14, 20, waveguides 17, 18, and a phase controller M6. By adjusting the phase through the phase modulator, the unequal arm MZI can distinguish the signal from the idler photon wavelength. The interference period is four times the microring resonant period (FSR) to separate the photons with a distance of 2 FSR, so that they are output from the two output ports of the interferometer. Configuring M5 and M6 to let the idler (signal) photons are output from the outer 21 and 24 waveguides and the signal (idler) photons are output from the 22 and 23 waveguides and then enter an MZI for interference. This interferometer includes beam splitters 25 and 28 and waveguide 26, 27 and phase modulator M7. The interference results are output to waveguides 29, 30, and waveguides 21, 24, 29, 30 are coupled to a single photon detector for detection.

Figure 13:
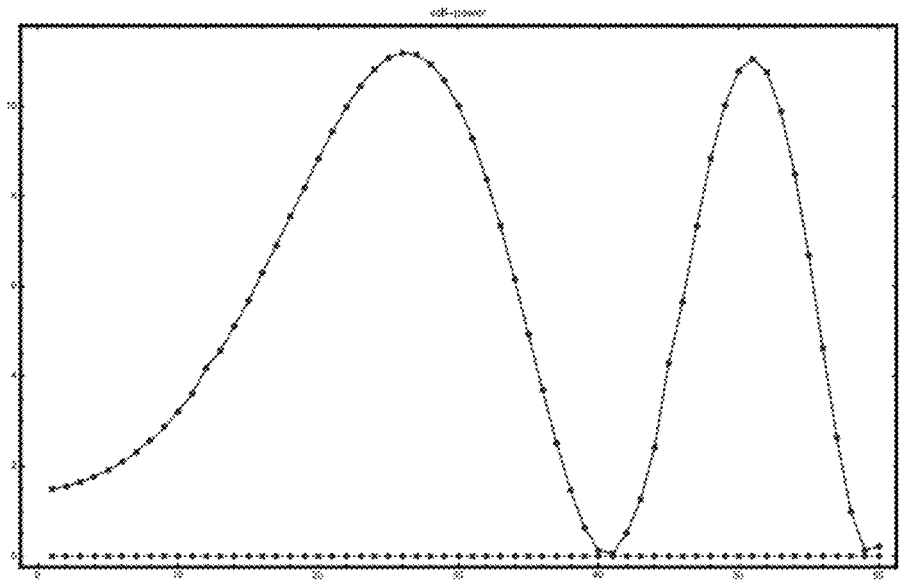
FIG. 13 shows the pump's output energy from another input waveguide in the chip of FIG. 12 as the voltage of the M1 modulator changes, reflecting the pump energy distribution of clockwise and counterclockwise one.

FIG. 13 is the pump's output energy from the other entrance waveguide with the voltage change of the M1 modulator in the chip of FIG. 12, which reflects the energy distribution of the clockwise and counterclockwise pump.

Figure 14:
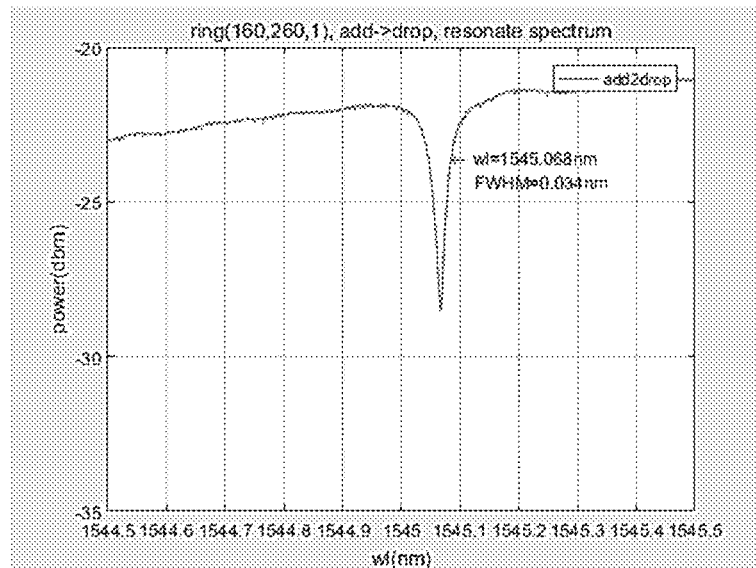
FIG. 14 shows the pump and signal (idler)'s transmission spectra.

FIG. 14 shows the transmission spectra of the pump and signal (idler) when C1 and C2 coupling gaps of the pump MZI are 160 nm, and the C3 and C4 coupling gaps of the signal and idler MZI are 260 nm with the full width at half maximum being 0.082 nm and 0.034 nm respectively.

Figure 15:
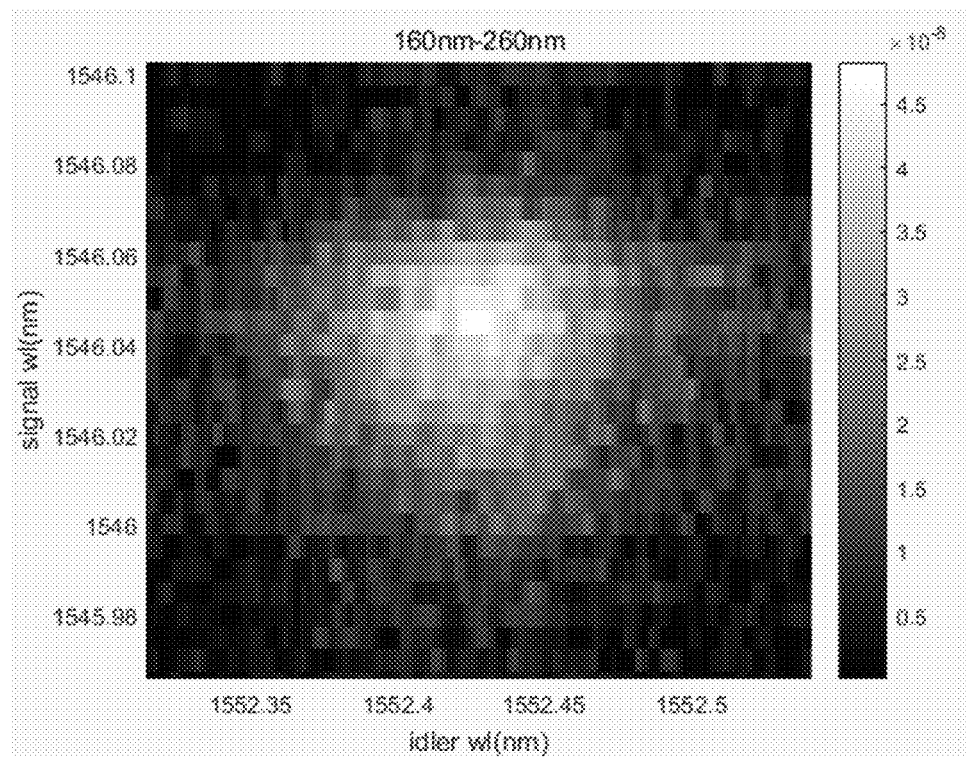
FIG. 15 The two-photon correlation spectrum when the pump's MZI coupling gaps of C1 and C2 are 160 nm and the signal's MZI coupling gaps of C3 and C4 are 260 nm, which is approximately non-correlated.

FIG. 15 is a two-photon correlation spectrum measured under the conditions of FIG. 14, which shows a nearly non-correlated spectrum and a photon pair with higher purity is obtained. At the same time, the clockwise and counterclockwise four-photon coincidences are also measured.

Example 5: Cascaded-MZI Coupled Microring Chip Device for High-Purity Photon Source Example 5 is a cascaded-MZI coupled microring with two phase modulators to manipulate the quality factor of each resonant mode. This design has one more phase modulator than the previous single MZI-coupled microring, which can realize flexible and controllable design of quality factor.

Figure 16:
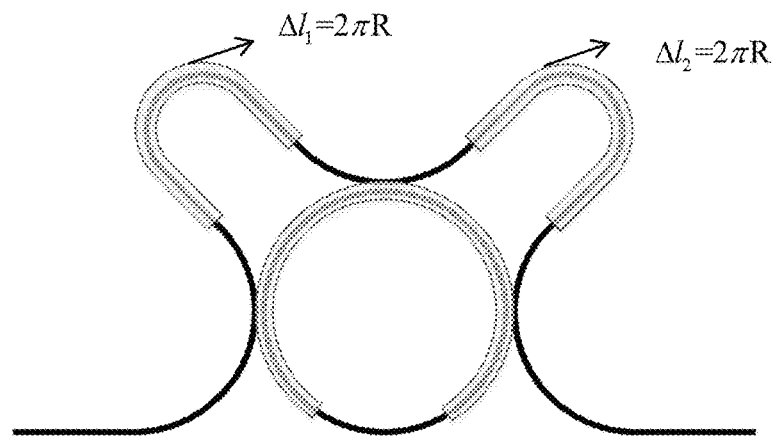
FIG. 16 The structure diagram of cascaded-MZI coupled microring chip.
Figure 17:
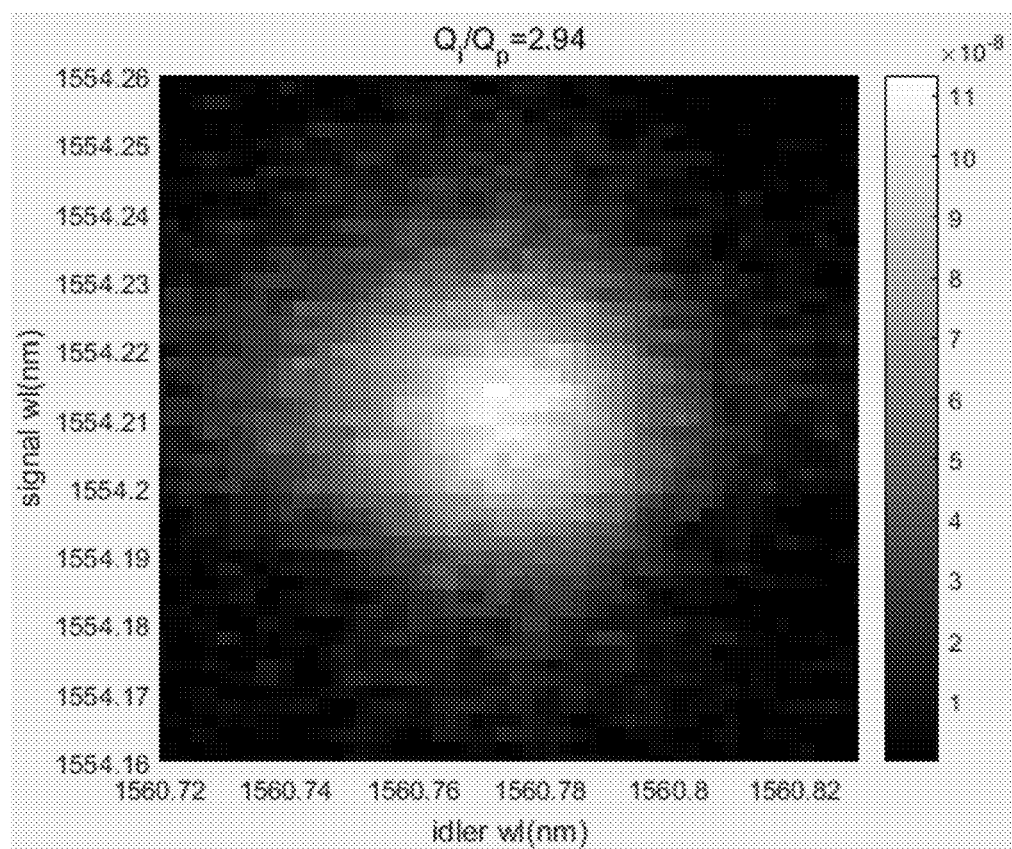
FIG. 17 Two-photon correlation spectrum from a cascaded-MZI coupled microring.

FIG. 16 is a cascaded-MZI coupled microring structure diagram. Both long arms of the cascade MZI are longer than the short arms on the microring. FIG. 17 is the measured correlation spectrum intensity of the signal and idler photons when the voltages of the two phase modulators are at specific values making the signal's (idler) quality factor is 2.94 times the pump's quality factor. This is a nearly non-correlated form, that is to say, the signal and idler spectrum are relatively pure.

REFERENCE

[1] W. Bogaerts, P. D. Heyn, T. V. Vaerenbergh, K. D. Vos, S. K. Selvaraja, T. Claes, P. Dumon, P. Bienstman, D. V. Thourhout, R. Baets, "Silicon microring resonators", Las. Photon. Rev. 6, 47-73 (2012)
[2] H. Jin, F. M. Liu, P. Xu, J. L. Xia, M. L. Zhong, Y. Yuan, J. W. Zhou, Y. X. Gong, W. Wang, and S. N. Zhu, "On-Chip Generation and Manipulation of Entangled Photons Based on Reconfigurable Lithium-Niobate Waveguide Circuits", Phys. Rev. Lett. 113, 103601 (2014)
[3] C. Wang, C. Langrock, A. Marandi, M. Jankowski, M. Zhang, B. Desiatov, M. M. Fejer, and M. Lončar, "Ultra-high-efficiency wavelength conversion in nanophotonic periodically poled lithium niobate waveguides", Optica 5, 1438 (2018)
[4] C. Wang, M. Zhang, X. Chen, M. Bertrand, A. Shams-Ansari, S. Chandrasekhar, P. Winzer, and M. Lončar, "Integrated Lithium Niobate Electro-Optic Modulators Operating at CMOS-Compatible Voltages", Nature 562, 101 (2018)
[5] M. Zhang, B. Buscaino, C. Wang, A. S. Ansari, C. Reimer, R. Zhu, J. M. Kahn, M. Lončar, "Broadband electro-optic frequency comb generation in a lithium niobate microring resonator", Nature (2019), https://doi.org/10.1038/s41586-09-1008-7
[6] M. He M. Xu Y. Ren J. Jian Z. Ruan Y. Xu S. Gao S. Sun X. Wen L. Zhou L. Liu C. Guo H. Chen L. Liu S. Yu L. Liu X. Cai "High-Performance Hybrid Silicon and Lithium Niobate Mach-Zehnder Modulators for 100 Gbit/s and Beyond". Nature Photonics (2019), https://doi.org/10.1038/s41566-019-0378-6.
[7] M. Ferrera, D. Duchesne, L. Razzari, M. Peccianti, R. Morandotti, P. Cheben, S. Janz, D.-X. Xu, B. E. Little, S. Chu, D. J. Moss, "Low power four wave mixing in an integrated micro-ring resonator with Q=1.2 million", Opt. Express 17, 14098(2009)
[8] K. Guo, X. D. Shi, X. L. Wang, J. B. Yang, Y. H. Ding, H. Y. Ou, Y. J. Zhao, "Generation rate scaling: the quality factoroptimization of microring resonators for photon-pair sources", Photon. Res. 6, 587 (2018)
[9] I. N. Chuprina, P. P. An, E. G. Zubkova, V. V. Kovalyuk, A. A. Kalachev, G. N. Gol'tsman, "Optimisation of spontaneous four-wave mixing in a ring microcavity", Quantum Electron. 47, 887(2017)
[10] M. Zukowski, A. Zeilinger, and H. Weinfurter, Entangling Photons Radiated by Independent Pulsed Sources, Ann. N.Y. Acad. Sci. 755, 91 (1995)
[11] A. W. Bruch, X. Liu, X. Guo, J. B. Surya, Z. Gong, L. Zhang, J. Wang, J. Yan, and H. X. Tang, 17 000%/W second-harmonic conversion efficiency in single-crystalline aluminum nitride microresonators Appl. Phys. Lett. 113, 131102 (2018)

The invention claimed is:

1. A reconfigurable nonlinear frequency conversion waveguide chip based on Mach-Zehnder interferometers (MZI) coupled micro-ring resonators, characterized in that the waveguide chip is comprised of
    phase-adjustable Mach-Zehnder interferometers (MZI) and micro-ring resonator,
    wherein the phase-adjustable MZI couples light and photons into and out of the micro-ring resonators and controls the micro-rings' quality factor to optimize the nonlinear frequency conversion processes inside the micro-rings by a phase-modulator inside the phase-adjustable MZI; and
    the micro-ring resonators enable the nonlinear optical generation of new frequency light beams and quantum light sources based on a second-order or third-order nonlinear optical processes; and
    linear optical circuits, for power splitting of pump beams and post-process of generated light beams or photons by a nonlinear process including the classic nonlinear parameter process and spontaneous parameter process for generating quantum light source.

2. The reconfigurable nonlinear frequency conversion waveguide chip of claim 1, characterized in that
    two arms of a MZI beam splitter are provided with a optical path difference, and phase difference of the two arms are configured to be dynamically adjusted;
    the phase difference of the two arms is controlled by a phase modulator in the MZI-micro-ring coupling chip, using thermo-optic, electro-optic, or optical-Kerr effects; and
    resonance wavelengths of the micro-rings are controlled by thermo-optical, electro-optical or optical-Kerr effects.

3. The reconfigurable nonlinear frequency conversion waveguide chip of claim 2,
    wherein the phase-adjustable MZI and the micro-ring resonators are formed by a single MZI micro-ring structure, or a cascaded MZI coupled micro-ring structure, and two or more independent MZIs coupled micro-ring structure;

wherein the cascaded MZI coupled micro-ring structure contains three or more coupling regions between the MZI and the micro-rings, multiple phases modulators are used to achieve greater tunability of the micro-rings' quality factors;

the independent MZIs coupled micro-rings control the quality factors of different resonance wavelengths separately.

4. The reconfigurable nonlinear frequency conversion waveguide chip of claim 3, wherein said reconfigurable nonlinear frequency conversion waveguide chip further comprises additional coupled straight waveguides, to form a four-port micro-ring structure;

the MZI-micro-ring coupling chip contains various combinations of MZI-micro-ring coupling structure and its extended structure to provide array-type nonlinear frequency conversion devices and quantum light sources device;

the MZI-micro-ring coupling chip also includes a waveguide integrated optical path that performs linear optical processing on the incident and outgoing light fields.

5. The reconfigurable nonlinear frequency conversion waveguide chip of claim 3, characterized in that material for the MZI-micro-ring coupling chip includes all second- and third-order nonlinear optical materials that can be made into a waveguide, including Lithium niobate, silicon, silicon nitride, gallium arsenide, aluminum gallium arsenide, aluminum nitride, and tantalum oxide, and the nonlinear processes in the MZI-coupled chip include all second- and third-order nonlinear optical processes, including second harmonic generation, difference frequency generation, sum frequency generation, parametric optical amplification, parametric optical oscillation, spontaneous parametric down conversion, third harmonic frequency generation, four-wave mixing, and spontaneous four-wave mixing processes.

6. The reconfigurable nonlinear frequency conversion waveguide chip of claim 5, characterized in that the MZI-coupled micro-ring chip includes waveguide circuits before and after the MZI-coupled micro-ring structure, which controls and processes pump laser incident into the MZI-coupled micro-ring and parametric light fields and quantum light sources output from the MZI-coupled micro-ring; and said waveguide circuits are equipped with electro-optic, thermo-optical, and optical-Kerr modulators.

7. The reconfigurable nonlinear frequency conversion waveguide chip of claim 6, characterized in that the MZI-coupled micro-ring chip enables high-efficiency classical parametric light fields and high-quality quantum light sources through modulating the MZI's phase, supplying high-efficiency nonlinear frequency conversion devices and quantum light source devices including high-brightness single-photon, two-photon and multi-photon sources, high heralding efficiency single-photon source, high-spectral-purity single-photon source, and high-indistinguishability multi-photon sources.

8. The reconfigurable nonlinear frequency conversion waveguide chip of claim 6, characterized in that light enters straight waveguide on the chip through end-coupling or vertical-coupling and is split through the first coupling region of the waveguide and micro-ring;

after being split, one output light field is coupled into the micro-ring and the other output light field is freely transmitted through the other arm of the interferometer;

the two light fields are coupled in the second coupling region between the micro-ring and the waveguide and interfere to obtain two new light fields with one light field being output through a straight waveguide, and the other light field being left in the ring to stabilize as a ring resonance mode at least one arm of the interferometer is provided with electro-optic, thermal-optic, and optical-Kerr modulators to regulate the two optical path differences to change the output of the interferometer, which is equivalent to dynamically controlling the coupling coefficient, external quality factor and total quality factor of the micro-ring, thereby optimizing the efficiency of the nonlinear process in the micro-ring and the quality of the quantum light source.

9. The reconfigurable nonlinear frequency conversion waveguide chip of claim 8, characterized in that the optical path difference between the two arms of the MZI is set to different values as required;

when the arm difference, namely the optical path difference of the MZI, equals to an integer multiple of the micro-ring's perimeter adjusting the optical path difference (phase difference) of the MZI's two arms can simultaneously adjust the quality factors of all resonant modes and achieve several wavelengths in a nonlinear process to reach critical coupling or other specific coupling conditions;

when the arm difference of the MZI equals to an odd multiple of half the micro-ring's perimeter, the quality factor of the nearest resonance peak in the micro-ring changes in the opposite direction, that is, the quality factor of a resonance peak increases while the quality factor of its left and right neighbors declines.

10. The reconfigurable nonlinear frequency conversion waveguide chip of claim 9, characterized in that when the arm difference, namely the optical path difference of MZI, equals to other values, the change trends of each resonant mode is designed to be on demand.

* * * * *